United States Patent [19]

Miyosawa

[11] 3,881,998

[45] May 6, 1975

[54] METHOD OF AFTER-TREATMENT FOR LITHOGRAPHIC PRINTING PLATES

[75] Inventor: Yushiaki Miyosawa, Hiratsuka, Japan

[73] Assignee: Kansai Paint Co., Ltd., Hiratsuka, Japan

[22] Filed: July 23, 1973

[21] Appl. No.: 382,026

[30] Foreign Application Priority Data

July 27, 1972 Japan .............................. 47-75277
July 27, 1972 Japan .............................. 47-75276

[52] U.S. Cl. ..................... 204/17; 204/58; 204/140
[51] Int. Cl. ......... B41c 3/08; B41n 1/04; C23b 9/02
[58] Field of Search ............ 204/17, 129.65, 129.75, 204/56, 58, 140

[56] References Cited

UNITED STATES PATENTS

| | | | |
|---|---|---|---|
| 2,119,031 | 5/1938 | Wescott | 101/401.1 |
| 2,472,304 | 6/1949 | Mason | 204/17 |
| 3,511,661 | 5/1970 | Rauner et al. | 204/17 |

FOREIGN PATENTS OR APPLICATIONS

| | | | |
|---|---|---|---|
| 1,210,543 | 10/1970 | United Kingdom | 204/17 |

*Primary Examiner*—T. M. Tufariello
*Attorney, Agent, or Firm*—Ostrolenk, Faber, Gerb & Soffen

[57] ABSTRACT

This invention relates to a method of after-treatment for lithographic printing plates having an aluminum substratum in order to impart an extended durability for offset printing which comprises passing an electric current through the surface of the non-image area of the aluminum substratum and a counter electrode, particularly with a trend of increasing electric voltage in course of time, in an aqueous solution of oxyacid salt or oxyacid salts after forming a printing element which is oleophilic and electrically non-conductive on the image area of the surface of the aluminum substratum and, if necessary, further processing with an aqueous solution of acid or salt.

13 Claims, No Drawings

METHOD OF AFTER-TREATMENT FOR LITHOGRAPHIC PRINTING PLATES

This invention relates to a method of after-treatment for lithographic printing plates.

Conventionally, lithographic printing plates for offset printing having aluminum or aluminum alloy as the substratum are used in the art of printing as presensitized plates or wipe-on plates. The surface of the substratum is usually grained or anodized to impart a water-retaining property for forming the non-image area, but the water-retaining property of these pretreated aluminum substratum is not durable owing to the poor abrasion resistance of aluminum. Furthermore, the procedure of graining or anodizing is highly laborious and time-consuming so that the lithographic material is unduly expensive.

This invention has an object to provide a lithographic printing plate having an extremely high hydrophilic property on the non-image area.

The further object of the invention is to provide a lithographic printing plate having a superior resolving power and durability for offset printing.

Another object of the invention is to furnish a lithographic printing plate which is not expensive.

A still further object of the invention is to provide a method of after-treatment for lithographic printing plates which is novel and convenient.

The outstanding feature of the invention is present in that the procedure for rendering or increasing of water-retaining property on the non-image area is done after the developing of the printing image.

Another feature of the invention is present in that a lithographic printing plate having an aluminum substratum is treated electrochemically in an aqueous solution of water soluble oxyacid salt to form a chemically converted hydrophilic layer merely on the non-image area after the developing of the printing image.

Many other features, advantages and additional objects of the present invention will become manifest to those versed in the art upon making reference to the following detailed description.

This invention provides an additional method of after-treatment for lithographic printing plates having a substratum made of aluminum or aluminum alloy (these are simply denoted as "aluminum" hereinafter) which has none of the defects mentioned above. The invention provides a novel and outstanding process for lithographic printing plates which is characterized in that a hydrophilic layer is formed on the aluminum non-image area after the developing of the printing image by an electrochemical treatment.

The surface of the aluminum substratum of the lithographic printing plates in the present invention is preferably grained, though a non-grained aluminum substratum can also be used. An aluminum substratum which is grained deeply is not necessary, that is, an aluminum plate which is grained lightly with Nylon (synthetic resin of rigid quality) brush, for example, is usable in the present invention because of the high effectiveness of the method for rendering or increasing the water-retaining property.

A printing element, which is electrically nonconductive and oleophilic, is formed on the image area of the surface of the aluminum substratum explained as above leaving the non-image area uncovered. The nature of the materials for printing element, method for application and the manner for forming the printing image are not limited and a wide selection is available, for example, the printing element on the image area is formed by exposing the layer of photosensitive (photo-curable or photo-degradable) composition on the surface of the aluminum substratum which is oleophilic and electrically non-conductive to light selectively by, for example, transmission through a transparent image sheet (a photographic negative or positive) and developing.

There are some kinds of photosensitive resin compositions, for example, photocurable polymeric compositions containing photopolymerizable synthetic resins such as polyesters, acrylic resins or polyurethanes, which have ethylenically unsaturated groups in their molecules and have a fortified photocurability by adding photosensitizers, and photodegradable resin compositions such as those containing diazonium type resin; both are suitable for the present invention. Lithographic printing plates are prepared by applying such compositions on an aluminum substratum either as presensitized plates or wipe-on plates.

When the lithographic printing plate is obtained by developing the printing image and baring the aluminum substratum at the non-image area, the plate is then processed electrochemically in an aqueous solution of oxyacid salt to form a hydrophilic chemical conversion layer on the surface of the non-image area.

As the oxyacid salt contained in the aqueous solution for after-treatment of the lithographic printing plates, one or more of those having lithium, sodium, potassium, ammonium and/or aluminum as cation(s) and silicon, chromium, tin, molybdenum, tungsten, vanadium, boron and/or phosphorus in the oxyanion, are used. As such there are, for example,:

silicates expressed by the general formula $M^1_2O \cdot xSiO_2$ where $M^1$ is Li, Na, K or $(NH_4)$ (same in latter cases) and $x$ is from 0.2 to 9.0, such as lithium silicate, sodium silicate, potassium silicate and ammonium silicate; chromates expressed by the general formula $M^1_2CrO_4$ such as lithium chromate, sodium chromate, potassium chromate and ammonium chromate; metastannates expressed by the general formula $M^2_2SnO_3$ where $M^2$ is Li, Na or K (same in latter cases), such as lithium metastannate, sodium metastannate and potassium metastannate; molybdates expressed by the general formula $xM^1_2O \cdot yMoO_3$ where $x$ is a positive integer from 1 to 5 and $y$ is a positive integer from 1 to 12, such as lithium molybdate ($Li_2MoO_4$), sodium molybdate ($Na_2MoO_4$), potassium molybdate ($K_2MoO_4$) and ammonium heptamolybdate ($(NH_4)_6Mo_7O_{24}$); phosphomolybdates expressed by the general formula $M^3_3PO_4 \cdot 12MoO_3$ where $M^3$ is Na or $(NH_4)$, such as sodium phosphomolybdate and ammonium phosphomolybdate; orthotungstates expressed by the general formula $M^2_2O \cdot WO_3$, such as lithium orthotungstate, sodium orthotungstate and potassium orthotungstate; metatungstates expressed by the general formula $M^4_2O \cdot 4WO_3$ where $M^4$ is Na or K (same in latter cases), such as sodium metatungstate and potassium metatungstate; paratungstates expressed by the general formula $5M^4_2O \cdot 12WO_3$ such as sodium paratungstate and potassium paratungstate; other tungstates expressed by one of the chemical formulae $(NH_4)_4W_5O_{17}$, $(NH_4)_6W_7O_{24}$, $Na_3PO_4 \cdot 12WO_3$ and $Ba[B(W_2O_7)_6]$; orthovanadates expressed by the general formula $M^5_3VO_4$ where $M^5$ is Li or Na (same in latter case), such as lithium orthovanadate and sodium orthovanadate; metavanadates expressed by the general formula $M^6VO_3$ where $M^6$ is Li, Na or $(NH_4)$, such as lithium metavanadate, sodium metavanadate and ammonium metavanadate; metaborates expressed by the general formula $M^2BO_2$ such as lithium metaborate, sodium metaborate and potassium metaborate; tetraborates expressed by the general formula $M_2{}^2B_4O_7$, such as lithium metaborate, sodium metaborate and potassium metaborate; other borates expressed by one of the chemical formulae $Na_2B_{10}O_{16}$, $NaBO_2 \cdot H_2O_2$, $NaH_2BO_3 \cdot 2HCOOH$ and $(NH_4)HB_4O_7$; orthophosphates expressed by the general formula $M_3{}^5PO_4$, such as lithium orthophosphate and sodium orthophosphate; pyrophosphates expressed by the general formula $M_4{}^4P_2O_7$, such as sodium pyrophosphate and potassium pyrophosphate; polyphosphates expressed by the general formula $(M^7PO_3)_n$ where $M^7$ is Na and $n$ is a positive integer from 2 to 14, such as sodium hexametaphosphate; and biphosphates such as aluminum biphosphate expressed by the formula $Al(H_2PO_4)_3$.

The suitable range of the concentration of the aqueous solution is from 5 to 40 percent by weight for the silicate of lithium, sodium, potassium and ammonium and from 1 percent by weight to saturation for the other oxyacid salts, i.e., chromates, stannates, molybdates, phosphomolybdates, tungstates, vanadates, borates and phosphates of lithium, sodium, potassium, ammonium, and aluminum listed above.

If the concentration of the solution is below the lower limit specified above, the conductivity of the solution is too low and the current density is so small that a quick and instantaneous processing cannot be expected. When the concentration of the solute in the solution exceeds 40 percent by weight in the case of the silicates, the solution is excessively conductive so that a smooth conversion layer cannot be formed because of the vigorous bubbling and local heating at the surface of the printing plate owing to the high current density and the high viscosity.

The lithographic printing plate to be processed is contacted with the aqueous solution of the oxyacid salt usually by dipping. The edge of the plate should preferably be exposed over the surface level of the bath solution at least at one side and the circuit connector should be attached to that portion, because, if an electrode or a circuit connector made of graphite or metals except aluminum and magnesium, which are inert against the oxyacid salt, is contacted and dipped into the solution, the hydrophilic and insulative chemical conversion layer cannot be formed effectively on the surface of the aluminum non-image area of the printing plate and the electric power is wasted due to the concentration of the electric current to the electrode or the circuit connector.

The counter electrode should be made of inert material against the aqueous solution of the oxyacid salt, such as stainless steel or graphite, should preferably be a rod, a mesh, a sheet or a board in shape, and should be stood opposed to the printing plate, preferably with an even interval to obtain an even current density at the surface of the non-image area of the printing plate.

The backside of the aluminum support of the printing plate should preferably be run closely along any insulative body such as non-conductive plastics board in order to avoid the waste of the electric power and the chemicals.

The temperature of the bath solution may be between about the freezing point and about the boiling point, though the room temperature such as from 10° to 40°C is the most convenient. The stirring of the bath solution is usually not required during the processing.

The electric current to be passed may be either direct or alternating. The current density at the surface of the aluminum non-image area should not exceed 10 amperes/dm², preferably 7 amperes/dm², and more preferably 3 amperes/dm². If the current density exceeds 10 amperes/dm², the smooth conversion layer cannot be obtained because of vigorous bubbling. On the other hand, a current density of below 0.1 ampere/dm² in the initial stage is not favored because a long duration is required for the procedure.

The integrated amount of the electricity to be passed is at least 10 coulombs/dm² for the aluminum non-image area. If the integrated amount of the electricity does not amount to 10 coulombs/dm², the chemical conversion layer thus formed is so thin and faint that no substantial improvement of the durability of the printing plate is attained. However an excess of electricity, such as over 250 coulombs/dm², is useless and wasteful.

Considering the limitations for the current density and the integrated amount of the electricity specified above, the electric voltage to be applied between the aluminum printing plate and the counter electrode should be accomodated suitably, that is, generally speaking, a comparatively lower voltage is to be applied in the initial stage of the processing where no insulative conversion layer is present on the surface of the aluminum to avoid the unfavorably high current density, then the voltage is to be raised gradually according to the formation of the insulative converted layer to obtain a favorable current density-time relationship which does not show any sudden-drop-down of the current density and to obtain a sufficient integrated amount of electricity passed. Inclusively, the voltage to be applied between the printing plate and the counter electrode is from 5 to 150 volts for the direct current and from 5 to 80 volts for the alternating current.

The raising of the voltage is performed by any convenient way, that is, either an electronic device or a non-electronic circuit is used. For example, the voltage is adjusted using a variable transformer or a slidac manually or automatically in the case of the alternating voltage or in the case of the direct voltage where an alternating electric power source and a rectifier is used. Another way of the raising the voltage is to connect a suitable resistance in the circuit of the direct current in series. In this case, the applied voltage between the aluminum substratum and the counter electrode is raised voluntarily according to the formation of the insulative converted layer though the output voltage of the power source is held constant. Especially, when an alternating current or a wavy or pulsating direct current having a ripple coefficient of, say, 18 percent or above is passed, the insulative chemical converted layer formed acts as if it was dielectric substance of an electric condenser so that the time constant is increased and an additional high voltage is induced between the both electrodes.

The time required for the processing is usually from 3 seconds to 10 minutes and not time-consuming. The processed printing plate is then rinsed with water to remove the residual oxyacid salt and dried. To accommodate offset printing, if necessary, lacquering according to the conventional printing technique is adopted.

The degree of the improvement of the durability for offset printing by the processing according to the present invention is very intensive. Illustratively, the durability of a lithographic printing plate which has a durability of about 10,000 sheets can be improved to about 40,000 sheets or more. The improvement of the durability for printing is to be considered on the one hand as due to the anodic oxidation to harden the printing element.

Furthermore, the sharpness of the printed image is improved because of the elimination of the minute irregularity of the edge line of the printing element.

When the printability of the lithographic printing plate is wasted by disappearance of the water-retaining property of the non-image area, the printability may be recovered by applying the method of the present invention.

The abrasion resistance of the converted layer is additionally intensified by the after treatment so that the durability of the printing plate is further increased. Namely, the electrochemically treated plate is immersed next in a bath containing a hardener solution which is an aqueous solution of acid or salt which is a strong electrolyte. For example, an aqueous solution of 0.1 to 5 % by weight of a carbonic acid such as acetic acid, crotonic acid, or oxalic acid, or an oxycarbonic acid such as hydroxyacetic acid, citric acid, tartaric acid or gluconic acid, an aqueous solution of 0.1 to 2 % by weight of a mineral acid such as phosphoric acid, or an aqueous solution of 0.1 to 5 % by weight of a neutral salt such as ammonium chloride or calcium nitrate or an acidic salt such as monobasic ammonium phosphate is suitable.

Hereinafter several Examples are shown as typical illustrations. However, they are to be considered as teaching a part of the executing practice.

EXAMPLE 1

A lithographic printing plate was prepared by applying a photosensitive wiping-on liquid for lithography on an aluminum plate grained with a Nylon brush. Then the plate was exposed to light through a negative of the resolving power test chart for printing and the printing image was developed. The area of the grained aluminum surface bared by developing as the non-image part was about 6 $dm^2$.

The lithographic printing plate was further immersed in a treating bath containing an aqueous solution of sodium silicate ($SiO_2/Na_2O=2$ in molar ratio) 10 weight % in concentration and connected to the anode of a selenium rectifier. The plate was stood along an insulative plastics board with which the backside of the aluminum substratum was covered. The counter electrode made of stainless steel was stood opposite to the printing plate and 15 cm apart in the same bath and connected to the cathode of the rectifier. The input terminal of the rectifier was connected to an alternating electric power source 50 Herz in cycle and 100 volts in voltage through a variable transformer.

The electric circuit is closed and electric voltage was applied between the printing plate and the counter electrode initially at 5 volts, and then the voltage was gradually raised according to the mode shown in Table 1.

Table 1

| | | | | | | |
|---|---|---|---|---|---|---|
| Time (sec.) | 0 | 5.0 | 10.4 | 16.4 | 23.5 | 31.7 |
| Voltage*(volts) | 5 | 10 | 15 | 20 | 25 | 30 |
| Current (amp.) | 13.9 | 12.2 | 10.6 | 9.1 | 7.5 | 6.0 |

*The voltage between the printing plate and the counter electrode

The integrated amount of the electricity passed was 309 coulombs and about 60 coulombs per $dm^2$ of the non-image area.

The non-image area of the aluminum substratum thus treated was excellent in water retaining property and the degree of water spreading was 8 times larger than the non-treated surface.

The durability of the printing plate for offset printing was 50,000 sheets or more as compared with the non-treated lithographic plate prepared as above, the durability of which was about 10,000 sheets.

EXAMPLE 2 to EXAMPLE 10

Several lithographic printing plates were prepared in like manner shown in Example 1.

They were then treated electrochemically using the same equipment containing an aqueous solution of various oxyacid salts. The electric voltage applied between the printing plate and the counter electrode initially was 5 volts in each case and was then gradually raised to obtain a sufficient chemical converted layer in a similar mode like in Example 1 as shown in Table 2.

Table 2

| Ex. No. | oxyacid salt | conc'n (wt.%) | treating time (sec.) | final voltage (V) | electricity unit area (coul./$dm^2$) | water spreading (arbitrary unit*) | durability for printing (sheets) |
|---|---|---|---|---|---|---|---|
| 2 | $K_2CrO_4$ | 5 | 32 | 50 | 52 | 4 | 30,000 |
| 3 | $K_2SnO_3$ | 2 | 31 | 30 | 38 | 3 | 20,000 |
| 4 | $K_2MoO_4$ | 5 | 32 | 50 | 55 | 3 | 25,000 |
| 5 | $K_2WO_4$ | 5 | 30 | 50 | 41 | 3 | 20,000 |
| 6 | $Na_3VO_3$ | 1 | 31 | 50 | 39 | 3 | 20,000 |
| 7 | $KBO_2$ | 5 | 32 | 50 | 46 | 4 | 30,000 |
| 8 | $(NaPO_3)_6$ | 5 | 30 | 50 | 61 | 4 | 25,000 |
| 9 | $2SiO_2,Na_2O$ $+KBO_2$ | 10 & 5 | 29 | 30 | 67 | 40 | 40,000 |
| 10 | $Al(H_2PO_4)_3$ | 10 | 30 | 50 | 60 | 5 | 35,000 |

*The water spreading on the non-treated aluminum surface (grained) is assumed as unity.

EXAMPLE 11

A lithographic printing plate was prepared in like manner shown in Example 1. The plate was then treated electrochemically using the same treating bath containing an aqueous solution of sodium silicate like in Example 1. The printing plate and the counter electrode were connected to an alternating electric power source (50 Herz, 110 volts) through a variable transformer and a rectifier. The applied voltage between both electrodes was initially 6 volts and then gradually raised to 22 volts during 40.6 seconds by operating the variable transformer.

The integrated amount of electricity passed was about 334 coulombs and about 64 coulombs/$dm^2$ for the non-image area.

The lithographic printing plate thus treated had a durability for offset printing at least 40,000 sheets.

EXAMPLE 12

A lithographic printing plate was prepared using a pre-sensitized plate (PS plate) (trade name "Plano Speed Kote", manufactured by Fuji Photo Film Co., Ltd., Japan, negative type) and exposing it to light through a lithofilm for a descriptive writing part of a newspaper (negative) followed by developing. Then, a hydrophilic converted layer was formed by an electrochemical after-treatment, that is, the plate was immersed in the same bath treating equipment as in Example 1 containing an aqueous solution of sodium silicate ($SiO_2/Na_2O$=2 in molar ratio) and potassium metaborate ($KBO_2$), the contents of which in the solution were 10 % by weight and 5 % by weight, respectively.

The non-image area of the plate was about 46 $dm^2$.

The applied voltage was 10 volts initially and raised to 50 volts during 156 seconds. The integrated amount of the electricity passed was about 77 coulombs/$dm^2$ for the non-image area.

The durability of the lithographic plate thus treated for offset printing was 80,000 sheets or more as compared with the non-treated plate having durability of about 25,000 sheets.

EXAMPLE 13

A lithographic printing plate prepared, exposed, developed and electrochemically treated in like manner as in Example 1 was further processed by dipping in a bath containing a hardener which was an aqueous solution of 0.5 % by weight of phosphoric acid for about 3 minutes at 30°C.

The durability of thus processed printing plate for offset printing was about 70,000 sheets.

What is claimed is:

1. A method of after-treatment for lithographic printing plates having an aluminum substratum for producing a hydrophilic chemical conversion coating on the non-image areas thereof, wherein said printing plates have an oleophilic and electrically non-conductive image areas on the surface of said aluminum substratum, which comprises passing electric current through the surface of the non-image area of said aluminum substratum by applying an electric voltage between said aluminum substratum and a counter electrode in an aqueous solution of at least one water-soluble oxy-acid salt selected from the group consisting of silicates, chromates, stannates, molybdates, phosphomolybdates, tungstates, vanadates, borates and phosphates of lithium, sodium, potassium, ammonium and aluminum, $(NH_4)_4W_5O_{17}$, $(NH_4)_6W_7O_{24}$, $Na_3PO_4 \cdot 12WO_3$, $Ba[B(W_2O_7)_6]$, $Na_2B_{10}O_{16}$, $NaBO_2 \cdot H_2O_2$, $NaH_2BO_3 \cdot 2HCOOH$ and $(NH_4)HB_4O_7$.

2. A method of after-treatment for lithographic printing plates as claimed in claim 1, in which the concentration of said chromates, stannates, molybdates, phosphomolybdates, tungstates, vanadates, borates or phosphates of lithium, sodium, potassium, ammonium or aluminum, $(NH_4)_4W_5O_{17}$, $(NH_4)_6W_7O_{24}$, $Na_3PO_4 \cdot 12WO_3$ $Ba[B(W_2O_7)_6]$, $Na_2B_{10}O_{16}$, $NaBO_2 \cdot H_2O_2$, $NaH_2BO_3 \cdot 2HCOOH$ and $(NH_4)HB_4O_7$ in said aqueous solution is from 1 % by weight to saturation.

3. A method of after-treatment for lithographic printing plates as claimed in claim 1, in which said electric current has a current density not exceeding 10 amperes/$dm^2$ of said non-image area of said aluminum substratum.

4. A method of after-treatment for lithographic printing plates as claimed in claim 1, in which the integrated amount of said electric current is not below 10 coulombs/$dm^2$ of said non-image area of said aluminum substratum.

5. A method of after-treatment for lithographic printing plates as claimed in claim 1, in which said electric current has a current density not exceeding 10 amperes/$dm^2$ and the integrated amount of said electric current is not below 10 coulombs/$dm^2$ of said non-image area of said aluminum substratum, respectively.

6. A method of after-treatment for lithographic printing plates as claimed in claim 1, in which said electric voltage is an alternating electric voltage of from 5 to 80 volts.

7. A method of after-treatment for lithographic printing plates as claimed in claim 1, in which said electric voltage is a direct electric voltage of from 5 to 150 volts.

8. A method of after-treatment for lithographic printing plates as claimed in claim 1, in which said electric voltage is increased from lower voltage to higher voltage during the application thereof.

9. A process of after-treatment for lithographic printing plates having an aluminum substratum as claimed in claim 1 wherein the resulting lithographic printing plates are contacted with an aqueous solution of an acid or salt selected from the group consisting of acetic acid, crotonic acid, oxalic acid, hydroxyacetic acid, citric acid, tartaric acid, gluconic acid, phosphoric acid, ammonium chloride, calcium nitrate, and monobasic ammonium phosphate.

10. A method of after-treatment for lithographic printing plates as claimed in claim 1 wherein said oxy-acid salt is sodium silicate.

11. A method of after-treatment for lithographic printing plates as claimed in claim 1 wherein said oxy-acid salt is a mixture of sodium silicate and potassium metaborate.

12. A method of after-treatment for lithographic printing plates as claimed in claim 1 wherein said oxy-acid salt is $Al(H_2PO_4)_3$.

13. A method of after-treatment for lithographic printing plates as claimed in claim 1, in which the concentration of said silicates of lithium, sodium, potassium and ammonium in said aqueous solution is form 5 to 40 % by weight.

* * * * *